United States Patent
Darveau (10) Patent No.: US 6,236,726 B1
(45) Date of Patent: May 22, 2001

(54) TRANSMIT POWER SCALING FOR FAR-END CROSSTALK REDUCTION

(75) Inventor: Michel F. J. Darveau, Aylmer (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/031,647

(22) Filed: Feb. 27, 1998

(51) Int. Cl.[7] .................................................. H04M 9/04
(52) U.S. Cl. .......................... 379/417; 379/410; 375/220
(58) Field of Search ..................................... 379/417, 410, 379/400, 406, 399; 375/257, 220, 346, 350, 286, 285, 219

(56) References Cited

U.S. PATENT DOCUMENTS

| | | | |
|---|---|---|---|
| 4,087,639 | * 5/1978 | Beene et al. | 370/482 |
| 4,112,370 | * 9/1978 | Monsen | 325/40 |
| 4,210,779 | * 7/1980 | Simokat | 370/488 |
| 4,777,653 | * 10/1988 | Bonnerot et al. | 455/69 |
| 4,924,492 | * 5/1990 | Gitlin et al. | 379/93 |
| 5,181,198 | * 1/1993 | Lechleider | 370/32.1 |
| 5,216,692 | * 6/1993 | Ling | 375/1 |
| 5,265,151 | 11/1993 | Goldstein | 379/97 |
| 5,271,037 | * 12/1993 | Szechenyi | 375/14 |
| 5,297,167 | * 3/1994 | Buzbee et al. | 375/10 |
| 5,479,447 | * 12/1995 | Chow et al. | 375/260 |
| 5,530,701 | * 6/1996 | Stillman et al. | 370/94.1 |
| 5,669,066 | * 9/1997 | Borg et al. | 455/69 |
| 5,832,387 | * 11/1998 | Bae et al. | 455/522 |
| 5,887,032 | * 3/1999 | Cioffi | 375/257 |
| 5,995,853 | * 11/1999 | Park | 455/574 |

* cited by examiner

Primary Examiner—William R. Korzuch
Assistant Examiner—Abul K. Azad
(74) Attorney, Agent, or Firm—Foley & Lardner (57) ABSTRACT

The invention provides a system and a method for decreasing the amount of crosstalk occurring within a data transmission system in which digital data is transmitted at high speeds over a telephone network. The invention makes use of intelligence at a plurality of the remote subscriber units to reduce differences in received data signal strengths at the central location, thus reducing the potential for crosstalk and corruption of data. The invention includes: receiving a signal at a subscriber unit from a central location over a communication line; determining the signal strength of the received signal at the subscriber unit; adjusting the transmit signal power using the received signal strength such that a data signal transmitted over the communication line from the subscriber unit at the adjusted transmit signal power would be received at the central location at approximately a desired signal strength; and transmitting a data signal to the central location at that adjusted transmit signal strength.

22 Claims, 4 Drawing Sheets

TRANSMIT POWER SCALING FOR FAR-END CROSSTALK REDUCTION

BACKGROUND OF THE INVENTION

The invention relates to the transmission of high speed digital data. Specifically, the invention provides a system and a method for decreasing the amount of crosstalk occurring within a data transmission system in which digital data is transmitted at high speeds over a telephone network.

The proliferation of home computers and the increase in usage of data networks, such as the Internet, has resulted in a marked increase in the amount of digital data transmitted over telephone networks. Data transmission systems utilizing voice band modems are approaching technological limits in efficiency and speed. Demand for both access to high speed data networks and higher data transmission rates has necessitated the development of new technologies for facilitating data transmission over traditional telephone lines.

One such newly developing family of technology involves digital subscriber lines (xDSL). For example, an Asymmetric Digital Subscriber Line (ADSL) allows for the transmission of both voice and data signals over the same twisted copper pair, at the same time. It allows a computer user access to high speed data networks, such as the Internet, at generally a faster rate than is available using traditional voice band modems. Since data signals are transmitted along with voice signals over traditional telephone lines, the ADSL user need not incur the expense of acquiring separate telephone lines or specialized data lines. Accordingly, demand for this technology has been considerable and its use within today's telephone networks is increasing rapidly.

In xDSL technologies, one end of the telephone line, usually of the twisted pair type, terminates at the location of the user in a subscriber unit. The other end of the telephone line terminates in a digital terminating unit at an access location within the telephone network, such as a central office or a remote access point such as a digital loop carrier. From this point, the user gains access to a digital data network, such as the Internet.

A problem arises when the telephone lines from multiple users transmitting data signals converge along the way to and at a common location such as the central office or digital loop carrier. Traditional telephone lines do not provide perfect separation between signals on different pairs. Some signal may leak from one pair and interfere with the signal on another nearby pair. This type of interference is known as crosstalk.

Two different types of crosstalk are known to those familiar in the art. These are Near-End Crosstalk (NEXT) in which the disturbed unit is located at the same end of the transmission line as the disturbing unit and Far-End Crosstalk (FEXT) in which the disturbed unit is located at the opposite end of the transmission line as the disturbing unit. In the case of xDSL systems as described herein, NEXT is alleviated by using a different frequency band for each direction of transmission and only FEXT remains as a possible reach limiting factor. Whenever mention is made of crosstalk in the present document, it is implied to be Far-End Crosstalk.

Traditional telephone lines provide much better separation and are less susceptible to crosstalk when they carry voice signals as opposed to data signals. While voice signals generally occupy bandwidth in the frequency range of 0 kHz to 4 kHz, data signals, in the case of xDSL technologies, occupy bandwidth on the telephone line at much higher frequencies; usually from 30 kHz and up to approximately the low megahertz range. For some xDSL systems, this range can extend to approximately 25 MHz. The physical characteristics of the traditional telephone lines are such that the higher data signal frequencies tend to leak more easily than the lower voice signal frequencies. Accordingly, the data signals carried over telephone lines are inherently susceptible to interference and crosstalk.

Exacerbating the problem is the disparity in the signal strengths of the data signals received at the central office. In existing xDSL systems, the strength of the data signal received at the central office depends, to a large degree, on the length and quality of the telephone line connecting the central office to the user's subscriber unit. Typically, the longer the distance between a user and the central office, the weaker the data signal received at the central office. Conversely, the data signal received from another user who is closer to the central office is much stronger.

When the telephone lines of two users converge along the way to and at the central office, especially if the lines are in physical proximity to each other, the stronger signal will tend to interfere and cause crosstalk with the weaker signal. The result is a decrease in the signal to noise ratio of the data signal from the more distant user and loss of data. As the number of such users in system increases and as more telephone lines carrying high speed data converge along the way to and at the central office, the potential for crosstalk and corruption of data increases exponentially.

SUMMARY OF THE INVENTION

The present invention solves the above identified problem. Specifically, the invention is a system and a method for use in a data transmission system for decreasing the amount of crosstalk occurring along the way to and near a central location within a telephone network. The invention makes use of intelligence at a plurality of the remote subscriber units to reduce differences in received data signal strengths at the central location, thus reducing the potential for crosstalk and corruption of data.

In the principal embodiment of the invention, a communication system and method are disclosed which reduce crosstalk between a plurality of communication lines within a telephone network. The invention includes: receiving a signal at a subscriber unit from a central location over a communication line; determining the signal strength of the received signal at the subscriber unit; adjusting the transmit signal power using the received signal strength such that a data signal transmitted over the communication line from the subscriber unit at the adjusted transmit signal power would be received at the central location at approximately a desired signal strength; and transmitting a data signal to the central location at that adjusted transmit signal strength. The desired signal strength can be predetermined for a central location such that data signals received at the central location from a plurality of subscriber units are received at approximately the desired signal strength.

Also disclosed is a subscriber unit for use in the present invention including a data signal transceiver and power scaling circuitry which makes use of the method of the present invention.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The present invention will be described below with reference to the accompanying drawings, wherein.

DETAILED DESCRIPTION OF THE PREFERRED EMBODIMENTS

As described herein with reference to the accompanying drawings, the present invention provides a method and apparatus for use in a data transmission system for decreasing the amount of crosstalk occurring within a telephone network. The invention makes use of intelligence at a plurality of the remote subscriber units to reduce differences in received data signal strengths at the central location, thus reducing the potential for crosstalk and corruption of data.

Figure 1:
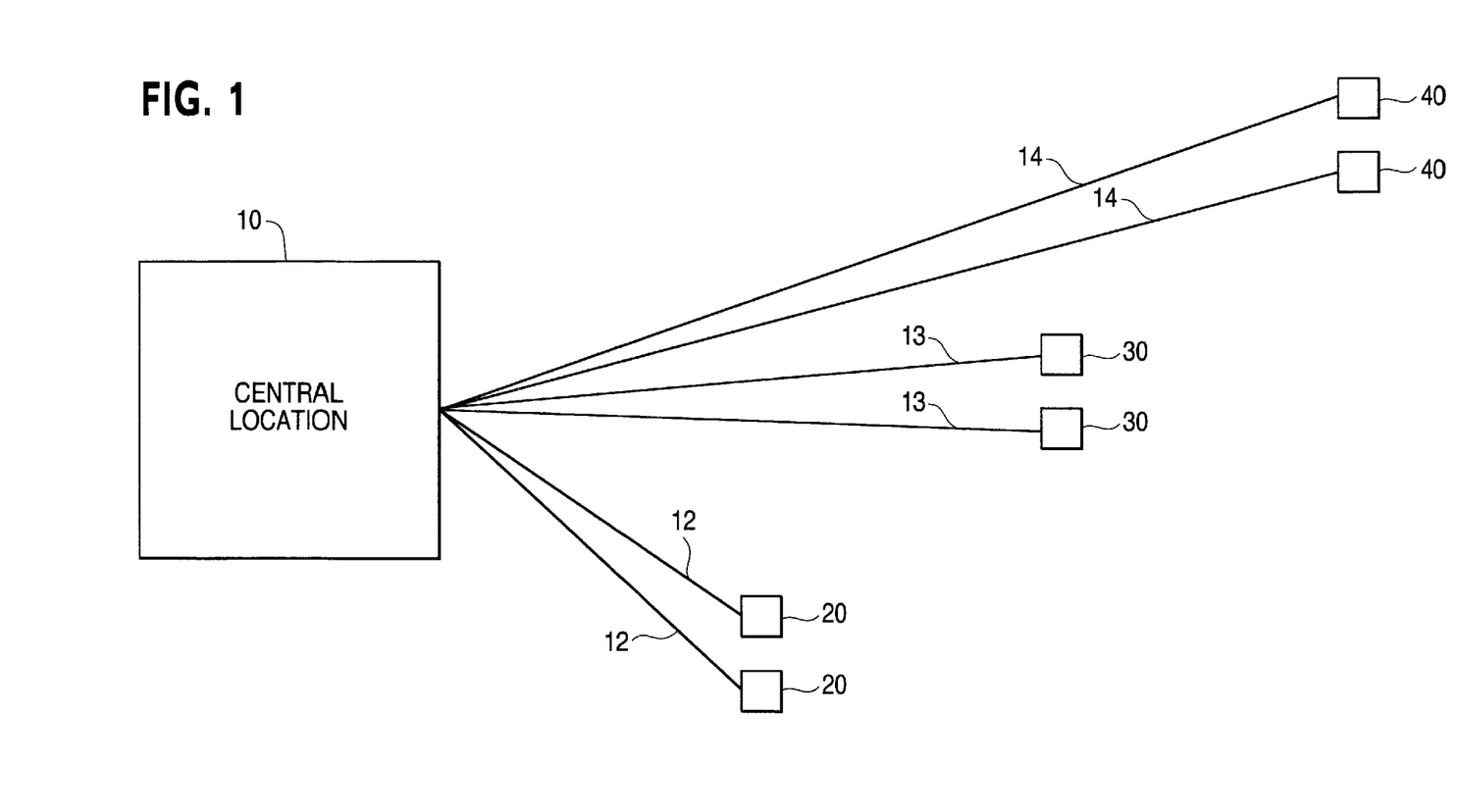
FIG. 1 is a block diagram showing the connections within a telephone network between a central location and various subscribers.

Referring now to the drawings, it should be noted that the figures are illustrative in nature and are not drawn to scale. FIG. 1 is a block diagram showing a typical telephone network configuration in which a central location 10 is connected to a plurality of subscribers 20, 30 and 40, by a plurality of communication lines 12, 13 and 14. The central location 10 is usually a central office, a digital loop carrier (DLC) or a switch. The subscribers 20, 30 and 40 are usually residences or businesses. The communication lines 12, 13 and 14 connecting the subscribers with the central location are usually traditional telephone lines, such as twisted pair.

Figure 2:
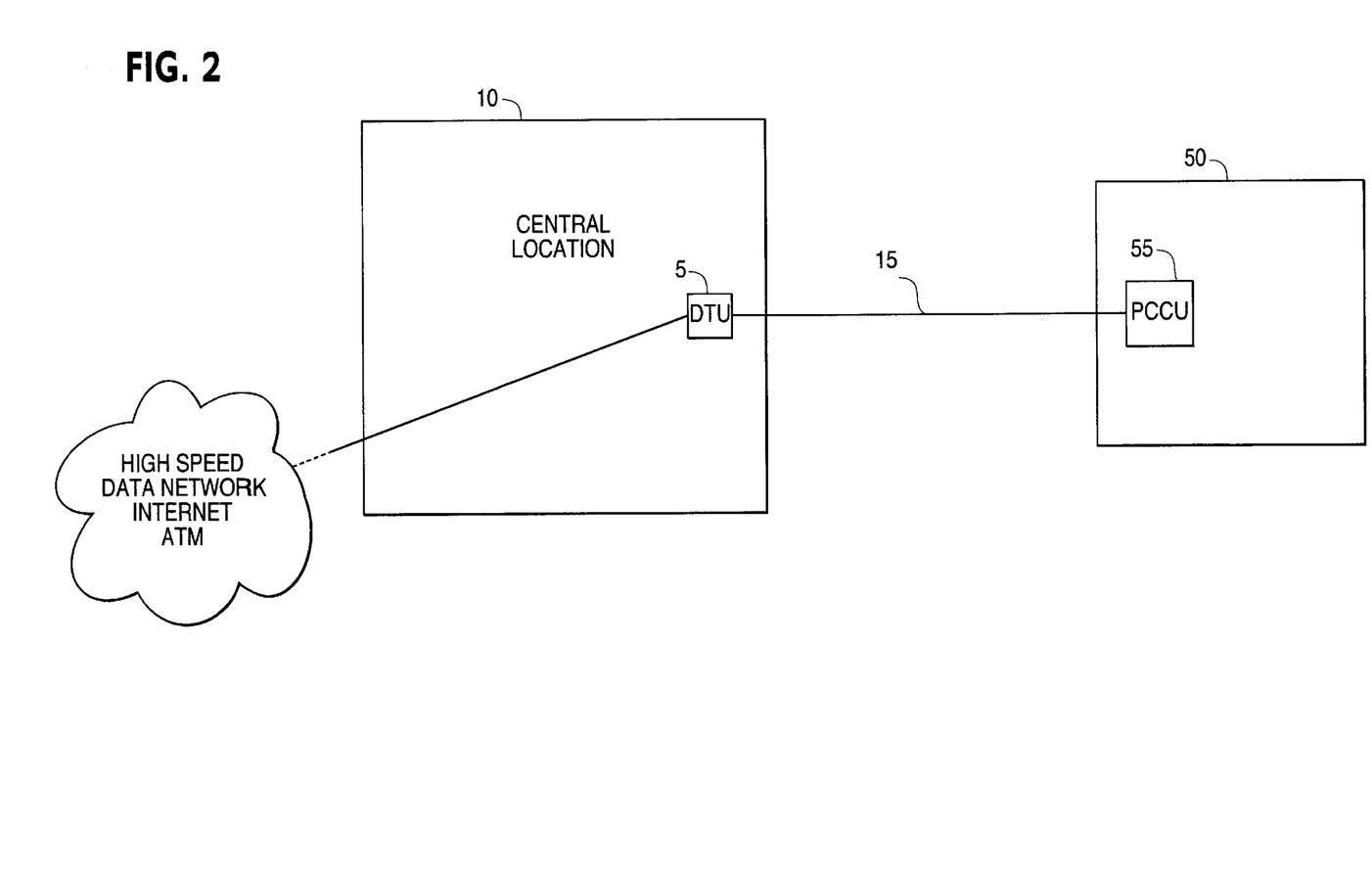
FIG. 2 is a block diagram showing the connection between a single subscriber unit and a digital termination unit within a central location of a telephone network.

FIG. 2 is a block diagram showing the connection between a single subscriber unit 55 and a digital termination unit 5 within a central location 10 of a telephone network. The subscriber unit 55, also known as a personal computer communication unit (PCCU), is located in the premises of a subscriber 50. The subscriber 50 in FIG. 2 can represent any of subscribers 20, 30 and 40 in the typical telephone network configuration shown in FIG. 1. Similarly, the communication line 15 can represent any of the communication lines 12, 13 and 14 in FIG. 1 and is usually a traditional telephone line, such as a twisted pair.

The subscriber unit 55 allows for connection with a personal computer or local area network (LAN) at the subscriber location. Data is communicated over the communication line 15 between the subscriber unit 55 and the digital termination unit 5 at the central location 10. Access to data networks such as the Internet, is made through the digital termination unit 5 at the central location 10. The digital termination unit 5 can be installed in a special equipment bay at the central office location or can be an integral part of an access line card of the telephone switch. The subscriber unit 55 can be implemented in a circuit pack included in a computer or in a stand alone box.

One technology that is used in communicating data between the subscriber 50 and the central location 10 is Asymmetric Digital Subscriber Line (ADSL). This technology allows for the transmission of both voice and data signals over the same twisted copper pair, at the same time. It allows a computer user access to high speed data networks, such as the Internet, at generally a faster rate than is available using traditional voice band modems. This technology is referenced in the description of the present invention only for the purposes of example, not limitation. Modifications to the configuration shown in FIG. 2 will be known to those of ordinary skill in the art. For instance, a plurality of communication lines can be multiplexed for use with a single digital termination unit. Such modifications do not serve to limit the present invention or its application.

In most telephone networks, such as the one depicted in FIG. 1, some subscribers are located closer to the central location than others. As a result, the length of communication lines between subscribers and the central location differs among subscribers. In FIG. 1, as between subscribers 20 and subscribers 30, the subscribers 20 are located closer to the central location 10 and are shown as such. Similarly, subscribers 20 and 30 are located closer to the central location 10 than are subscribers 40. As a result, the length of the communication lines 12, 13 and 14 differ accordingly with communication lines 12 shown as the shortest and communication lines 14 shown as the longest.

Signals attenuate as they travel over communication lines, especially traditional telephone lines. The differences in the lengths of the communication lines causes those signals travelling over longer communication lines to attenuate more than those signals travelling over a shorter path to the central location. Thus, a signal transmitted from a subscriber 40 over a communication line 14 will have a weaker received signal strength at the central location 10 than would a signal transmitted from a subscriber 20 over a communication line 12 or from a subscriber 30 over a communication line 13.

A central location 10 generally has a plurality of co-located receivers for receiving signals from communication lines and subscribers. This results in a plurality of communication lines physically converging in a relatively small physical area within the central location 10. In addition, a plurality of communication lines tend to converge and share cable along the way to the central location. That the plurality of signals converging within a small physical area have different signal strengths is generally not troublesome in the context of voice signals. The design of traditional telephone lines is such that they tend to provide adequate separation between voice signals. This is because the low frequencies involved in voice transmission do not suffer a high degree of attenuation over the subscriber loop which acts to limit the difference in signal strength received at the central location and moreover the coupling path between adjacent signals does suffer a high degree of loss at those frequencies.

As discussed herein, there has been a marked increase in the amount of digital data being transmitted over the same communication lines that carry voice signals. While the design of traditional telephone lines are such that they may provide adequate separation for voice signals, even under the circumstances described above, the same does not hold true when the telephone lines carry data signals. Due in part to the higher frequencies involved, data signals tend to leak from a traditional telephone line more easily than do voice signals. When a plurality of communication lines carrying data signals physically converges in a relatively small area within the central location or along the way to the central location, the potential for such signals to cause interference, or crosstalk and thus corrupt data, increases significantly.

The potential for such crosstalk becomes even greater when one data signal has a much higher signal strength than a neighboring data signal. This commonly occurs due to differences in the length of the respective communication lines as discussed above and is caused by the high level of attenuation suffered at the frequencies used by the data signal. In such a case, the data signal received with the relatively weak signal strength is susceptible to interference from a neighboring received data signal of stronger signal strength. This is true even though the signals are carried on physically separate lines. The result is that the receiver, or digital termination unit 5 in FIG. 2, that was intended to receive only the relatively weaker data signals also, inadvertently, receives data leaked from the communication line carrying the stronger data signal. This tends to corrupt the otherwise acceptable weaker data signal.

The present invention provides a system and a method for substantially eliminating the above mentioned crosstalk and corruption of data. The invention makes use of intelligence at a plurality of the remote subscriber units to reduce differences in received data signal strengths at the central location thus reducing the susceptibility of a weaker data signal to interference from a stronger one. This, in turn, reduces the potential for crosstalk and corruption of data.

The present invention reduces crosstalk between a plurality of communication lines within a telephone network. A first embodiment of the invention, with reference to FIG. 2, operates as follows. A signal from a central location 10, preferably a data signal from a digital termination unit 5 within the central location 10, is received at a subscriber unit 55 over a communication line 15. The subscriber unit 55 determines the signal strength of the signal received from the central location 10. There are multiple methods known in the art by which this signal strength can be determined, any one or combination of which can be used herein.

Having determined the received signal strength, the subscriber unit 55 then combines this information with the known transmit power level of the central location 10 to determine the electronic length of the communication line 15. For example, the known transmit power from central location 10 is stored in subscriber unit 55. Based upon the loss of the signal transmitted from the central location 10 to the subscriber unit 55 over communication line 15, the subscriber unit 55 can approximate the loss a data signal would incur when transmitted in the opposite direction from the subscriber unit 55 to the central location over the same communication line 15.

Using this information, the subscriber unit 55 can adjust its transmit power such that a data signal transmitted over the communication line 15 from the subscriber unit 55 at the adjusted transmit signal power would be received at the central location 10 at approximately a desired signal strength. The subscriber unit 55 then transmits its data signals over the communication line 15 at the adjusted transmit signal power. How close the received signal power at the central location 10 is to the desired signal strength depends upon the resolution of a controllable attenuator within the subscriber unit 55 to be described herein. This desired signal strength can be predetermined and set for an entire system such that the received data signals from a plurality of subscriber units connected to a given central location are all received at approximately the same strength.

Figure 3:
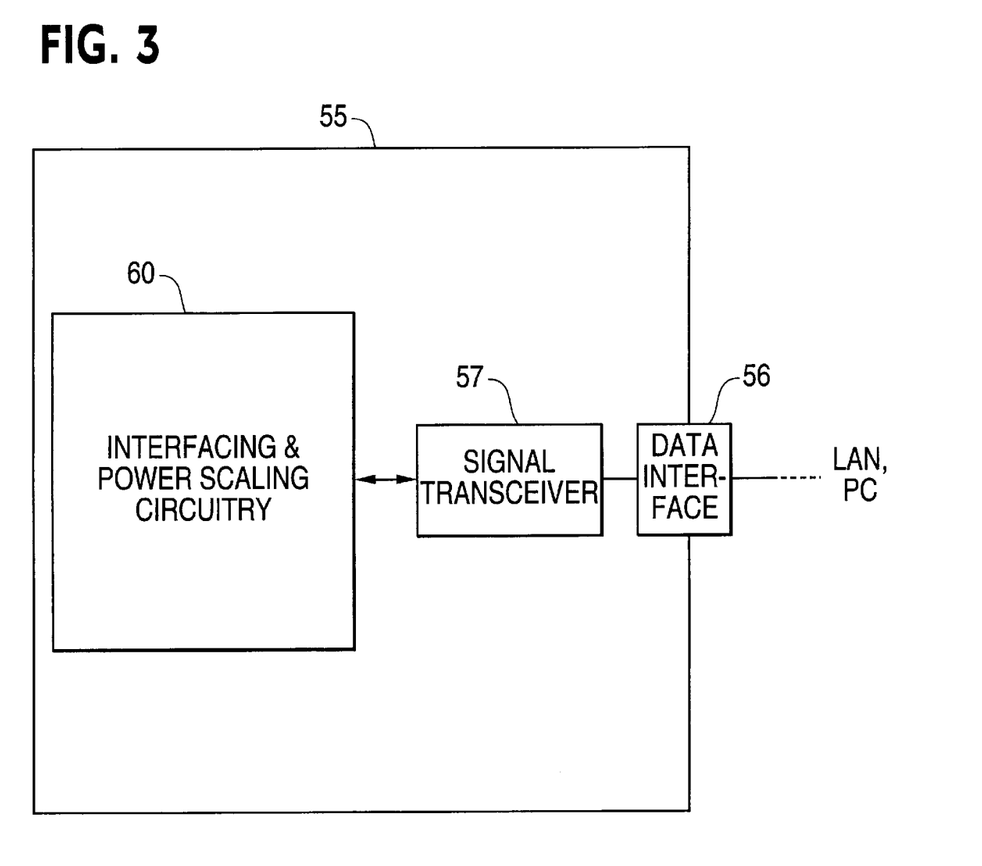
FIG. 3 is a diagram showing a subscriber unit and its main components.

Additional embodiments of the invention will be described herein. Turning to FIG. 3, shown is a block diagram of the subscriber unit 55, or personal computer communication unit (PCCU) useful in the present invention and its main components, including power scaling and interfacing circuitry 60, a signal transceiver 57 and a data interface 56. The subscriber unit 55 connects to a personal computer or local area network through the signal transceiver 57 and the data interface 56. The signal transceiver 57 generates and recovers the modulated signal present on the subscriber loop 15 and converts it to a binary data stream supplied to the data interface 56. While quadrature amplitude modulation (QAM) is used in the preferred embodiment, the signal transceiver 57 can use any other known modulation techniques to generate and recover a band limited data signal, such as discrete multi-tone (DMT) or carrier-less amplitude and phase (CAP). The data interface 56 performs the necessary protocol conversion to pass the data to a computer over a LAN or a back plane.

Figure 4:
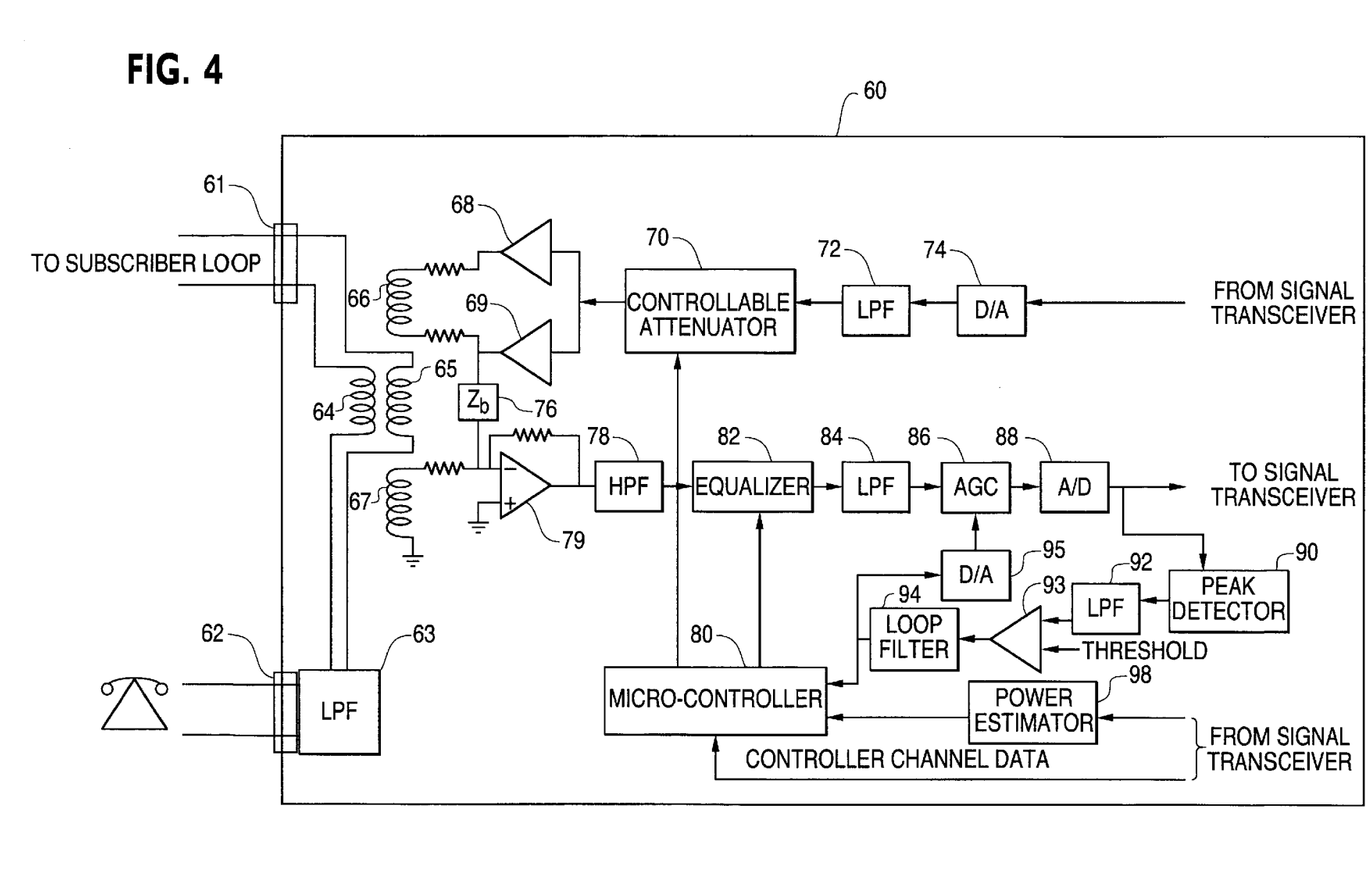
FIG. 4 is a detailed diagram showing interfacing and power scaling circuitry within a subscriber unit.

FIG. 4 is a detailed diagram showing the interfacing and power scaling circuitry 60 within the subscriber unit 55 or personal computer communication unit (PCCU). A connection to the subscriber loop and central office via the communication line 15 is made at port 61. As mentioned, in the preferred embodiment, the communication line 15 is of the twisted pair type over which both voice and data signals can be transmitted. Port 62 allows the connection of a standard telephone to the subscriber unit 60. The low-pass filter 63 substantially isolates the voice signals presented at port 62 from any data signals which may also have been carried on the twisted pair. DC continuity is maintained between the subscriber loop at port 61 and the telephone at port 62 through the coils 64 and 65. Accordingly, a telephone connected at 62 will function normally regardless of the operation of the remaining circuitry in the subscriber unit 60. The low-pass filter 63 can, in the alternative, be located outside of the subscriber unit 55 at the subscriber entry point, know in the art as a "demarcation point". In such case, port 62 would not be present and the low-pass filter 63 shown inside of the interface circuit 60 on FIG. 4 would be replaced by an AC termination such as a capacitor (not shown). The data signals are injected onto the subscriber loop through the coil 66 and received from the subscriber loop through coil 67.

We turn now to the data signal to be transmitted which is supplied to the interfacing and power scaling circuitry 60 by the signal transceiver 57. The data signal, in digital format, is supplied to a digital-to-analog converter 74. In the preferred mode of the invention, the resulting analog signal has a frequency in the range of 40 kHz to 90 kHz. The high frequency noise components of the analog data signal are then reduced when the signal is passed through the low-pass filter 72 which, in the preferred mode of the invention, has a corner frequency of approximately 95 kHz. The data signal is then supplied to the controllable attenuator 70 which adjusts the transmit power of the data signal. The controllable attenuator 70 is controlled via the micro-controller 80, operation of which is discussed herein.

It will be apparent to one of ordinary skill in the art that this controllable attenuator 70 can be one of any number of types including one that can provide a continuous attenuation and one in which the power of a signal can be attenuated in a finite number of increments. Control over the transmit signal power, and thus, over the received signal power at the central location, improves as the number of increments available in the controllable attenuator increases and their respective sizes decrease. In the verification of the preferred embodiment of the invention, successful results were achieved using a controllable attenuator with four levels of attenuation, resulting in output signal strengths of approximately +5 dbm, −5 dbm, −15 dbm and −25 dbm.

The adjusted data signal is supplied from the controllable attenuator 70 to drivers 68 and 69 which together convert the data signal to one having a differential voltage. The data signal is then injected onto the subscriber loop through coil 66 which is output from the subscriber unit at port 61.

As mentioned, data signals arriving from the central location 10 through port 61 via the subscriber loop, are received at the subscriber unit 55 through coil 67. Inadvertently, this coil 67 will also receive the data signal being output from the subscriber unit and injected onto the subscriber loop by coil 66. Normally, this would not be a problem because the two signals occupy different frequency bands. However, the combined amplitude of the two signals requires an excessive dynamic range. This is because the output data signal is at a much higher amplitude than the received data signal. To address this problem, box Zb 76 provides a cancellation path by combining the transmit signal present at the output of driver 69 with the received signal picked up by coil 67. These two signals are combined in the summing node of op-amp 79. The box Zb 76 approximates the frequency response of the signal path via coils 66 and 67. The received data signal is then passed through a high-pass filter 78 to provide additional separation between the output and input data signals. Since the frequency range of the received data signal, approximately 160 kHz to 320 kHz in the example described herein, is higher than that of the data signal transmitted from the subscriber unit, 40 kHz to 90 kHz, the high-pass filter effectively attenuates any remaining components of the output data signal from the received data signal. Thus, the data signal received is predominantly that transmitted from the central location, while the effects of the data signal transmitted from the subscriber unit are substantially canceled.

The received data signal is then subjected to equalization in equalizer 82. The equalizer 82 corrects for distortion introduced by the subscriber loop and is controlled by the micro-controller 80. In the preferred embodiment, the equalizer 82 has five different settings, selectable through the micro-controller 80, wherein each setting represents a different configuration or range of lengths of the subscriber loop. The data signal is then subjected to a low-pass filter 84 which rejects noise that might be present outside of the data signal bandwidth. AM radio signals are examples of such noise rejected by low-pass filter 84.

The data signal at this point is still relatively weak. The data signal from the low-pass filter 84 is then subjected to amplification in an automatic gain controller (AGC) 86. The range of automatic gain controller used in the tested invention was 0 dB to 80 dB. The magnitude of the amplification is dynamic and is determined using a feedback loop described herein. The data signal, still in analog format, is amplified in the automatic-gain controller 86, to approximate, in the preferred embodiment, a one volt peak-to-peak amplitude window. The signal is then presented to an analog-to-digital converter 88 for digital coding. The received data signal, now in digital format, is supplied to the signal transceiver 57 for recovery of the digital data.

The peak detector 90 samples the data signal after amplification in the automatic gain controller 86 and conversion from analog to digital in the A/D converter 88. The peak detector 90, in conjunction with a low-pass filter 92 creates a long term average of the absolute value of the signal envelope which is compared with a controllable threshold by comparator 93. The output of comparator 93 is passed through a loop filter 94 which controls the AGC feedback loop dynamic response and whose output constitutes the control voltage which is provided to and serves to control the automatic gain controller 86 via the digital-to-analog converter 95. The controllable threshold applied to comparator 93 is adjusted to ensure that the data signal approximately fills a one volt peak-to-peak window. The difference between the signal envelope amplitude and the threshold value constitutes the "error term" which is amplified by the comparator 93 to provide the control voltage for the automatic gain controller 86.

The digital value of the control voltage, on which the gain of the automatic gain controller 86 is fully dependent, is also provided to the micro-controller 80. The micro-controller 80 uses this information regarding the gain of the automatic gain controller 86 to calculate what the signal strength of the received data signal was before amplification by the automatic gain controller 86.

The inventor has found, however, that this calculated signal strength is often inaccurate since the data signal may have suffered distortion through the subscriber loop 15 and may include noise therefrom. The power estimator 98 improves the accuracy of the calculation of the received data signal strength and its operation is described herein. The signal transceiver 57 tends to remove much of the noise and distortion surrounding a data signal received as input from the analog-to-digital converter 88. The "cleaned" signal is then supplied from the signal transceiver 57 to the power estimator 98. If the power of the signal as measured by the power estimator 98 is approximately that of a one volt peak-to-peak signal (i.e. not much of the signal was removed in the signal transceiver 57), it indicates that the data signal did not include much noise. If, conversely, the power as measured by the power estimator is much lower than that of a one volt peak-to-peak signal, it indicates that there was a not insignificant amount of noise present in the data signal and any calculation of received data signal strength based solely on the AGC control voltage may be inaccurate. Therefore, the output of the power estimator 98 is supplied to the micro-controller 80 which in turn uses information from both the AGC control voltage and the power estimator 98 to accurately calculate the received data signal strength.

Once an accurate calculation has been made of the received data signal strength by the micro-controller 80, based upon this information, the micro-controller makes a determination as to what power level is to be used in transmitting a data signal from the subscriber unit 55. The subscriber unit 55, as described in reference to FIG. 2, combines the information on the received signal strength with the known transmit power level of the central location 10 to determine the electronic length of the communication line 15. In other words, based upon the loss of the signal transmitted from the central location to the subscriber unit 55 over communication line 15, and knowledge thereof, the subscriber unit 55 can approximate the loss a data signal would incur when transmitted from the subscriber unit 55 to the central location over the same communication line 15.

Using this information, the micro-controller 80 can adjust the controllable attenuator 70 so that the data signal transmitted over the communication line 15 from the subscriber unit 55 would be received at the central location 10 at approximately a desired signal strength. This desired signal strength can be predetermined and set for an entire system such that the received data signals from a plurality of subscriber units connected to a given central location are all received at approximately the same strength or at strengths such that a certain minimum signal-to-noise ratio is maintained for each communication line.

Generally, the stronger the received data signal strength at the subscriber unit, the shorter the length of the communication path between the subscriber unit 55 and the central location 10. In a case where the received data signal strength is relatively strong, the micro-controller 80 will presume that the communication path is relatively short and will control the controllable attenuator 70 such that a relatively large attenuation is imposed upon a data signal before it is transmitted from the subscriber unit 55 to the central location 10. This will help to ensure that the data signal received at the central location 10 from subscriber unit 55 is not significantly stronger than those received from other subscriber units. Instead of having the micro-controller 80 control a controllable attenuator 70, those of ordinary skill in the art will appreciate that in using the method of the present invention, the transmit data signal power for the subscriber unit 55 can be controlled by directly controlling the output power of a transmitter within the subscriber unit 55.

In the preferred embodiment of the invention, the determination of the level of attenuation to which to set the controllable attenuator 70 is made via the use of a look-up table in the micro-controller 80. Such a table would indicate, for any given received data signal strength, the appropriate attenuation level for the controllable attenuator 70. Depending upon the complexity and resolution of the controllable attenuator chosen and on the intended distance reach of the communication system, the look-up table and the number of attenuation level indications can be modified.

In another embodiment of the invention, the determination of the level at which to set the controllable attenuator 70 is made via a direct calculation in the micro-controller 80 using the information on the subscriber unit transmit power and the predicted signal loss over the communication line 15. Such direct calculations are relatively straightforward and are known in the art. Such a method would be appropriate for use with an attenuator offering continuous attenuation.

In another embodiment of the invention, a controller communication channel between the central location 10 and the subscriber unit 55 is used. This controller communication channel is incorporated in the framing portion of a data stream via the use of 8-bit words. The channel allows for direct communication between the central location 10 and the subscriber unit 55. Data from the controller communication channel is extracted from the data stream and provided to the micro-controller 80 as shown in FIG. 4.

In the present invention, the control channel can be used to provide the central location 10 with direct control over certain aspects of the operation of individual subscriber units 55. One important use of the control channel is to override the determination made by the subscriber units of the power at which data signals are transmitted from the subscriber units 55. For instance, the central location 10 can determine, based upon the signal it receives from the subscriber unit, that the subscriber unit 55 should increase or decrease its transmit signal strength. The subscriber unit 55 can be instructed accordingly over the control channel. This can be done for any number of reasons, including prevention of interference or simply for testing purposes.

In another embodiment of the present invention, a database is located at the central location 10. This database contains information regarding the actual distance of individual subscriber units from the central location 10. This information can be transmitted to the subscriber unit 55 over the control channel and used by the micro-controller 80 in determining the level of attenuation to use with the controllable attenuator 70. In the alternative, the information transmitted to the subscriber unit 55 could simply be a command to transmit at a specific power level.

In yet another embodiment of the present invention, central office transmit power reduction is accommodated. There may be occasions when the central location 10 does not transmit data signals at full power. To make efficient use of total output power capabilities of its equipment, the central location, in this case a central office, may be transmitting at a reduced power, but to a greater number of subscribers. In this case, since its determination is based on knowledge of the central location transmit power level, a subscriber unit 55 cannot accurately determine the appropriate level at which to transmit to provide a received data signal of a desired level at the central location 10. If the central location is transmitting at a reduced power without informing the subscriber unit, the subscriber unit will interpret the weaker received signal strength as indicative of a communication line of much greater length than its true length. To accommodate the use of central office power reduction mode with the present invention, the controller communication channel is used to provide an indication from the central office to the subscriber unit 55 that the central location 10 is transmitting data signals at a reduced power. The subscriber unit 55, having received this indication, can adjust its determined transmit signal power accordingly.

In still another embodiment of the invention, the existence of bridge taps, unterminated cable stubs or other signal decreasing devices on the path between the central location 10 and the subscriber unit 55 is addressed. As these attenuators tend to affect signals of only certain frequency bands, their existence along the communication line 15 often reduces the signal strength of the signals transmitted from the central location 10 but do not necessarily have the same effect on signals transmitted from the subscriber unit 55 due to the difference in frequency ranges of these signals. The amount of attenuation depends upon the number and types of the attenuators present along the communication line 15. Without any additional information, the subscriber unit 55 will interpret the weaker received signal strength, resulting from the existence of bridge taps or other attenuators, as indicative of a communication line of greater length than its true length. This will prevent the subscriber unit 55 from accurately determining the appropriate level at which to transmit. To facilitate proper operation of the present invention amidst the existence of bridge taps and other attenuators, the controller communication channel is used to provide an external attenuation signal from the central location 10 to the subscriber unit 55 indicating that a certain amount of transmit signal attenuation is required. The subscriber unit 55, having received this indication, can adjust its determined transmit signal power accordingly. It will be apparent to one skilled in the art that the controller communication channel could also be used to indicate the existence of amplifying devices along the communication path 15. The subscriber unit 55 having received this indication, can accordingly reduce the amount of attenuation placed upon the signals transmitted therefrom.

In another embodiment of the invention, the reliance on a micro-controller 80 can be reduced or eliminated through the use of an analog control loop in the present invention to control the attenuation level of the controllable attenuator 70. Referring to FIG. 4, such an analog control loop could be implemented by using the output signal of the digital-to-analog converter 95, known as the AGC control voltage, and using it as input to an operation amplifier (not shown) or a comparator ladder (not shown). Based upon the strength of the input signal from the digital-to-analog converter 95, the output signal of either of devices will control the controllable attenuator 70 accordingly.

It is intended that the invention, as described herein, include all variations and modifications as fall within the scope of the claims and equivalents thereof.

What is claimed is:

1. A method of reducing crosstalk among a plurality of communication lines, said method comprising:

receiving a signal at a subscriber unit from a central location over a communication line;

determining a received signal strength of said received signal at the subscriber unit;

determining from said received signal at the subscriber unit an existence of an override signal, wherein the override signal contains an instruction from the central location to the subscriber unit to set the adjusted transmit signal power to a level contained in the override signal;

in the absence of an override signal, adjusting in the subscriber unit a transmit signal power using said received signal strength such that a data signal transmitted over said communication line from the subscriber unit at the adjusted transmit signal power would be received at the central location at approximately a desired signal strength;

in the existence of an override signal, adjusting the transmit signal power to the level indicated by the override signal; and transmitting a data signal at said adjusted transmit signal power from the subscriber unit to the central location over said communication line.

2. A method according to claim 1 wherein the desired signal strength is predetermined for the central location such that data signals are received at the central location from a plurality of communication lines at approximately the same received signal strength.

3. A method according to claim 1 wherein the step of adjusting a transmit signal power includes the step of controlling an attenuator to perform adjustment of transmit signal power.

4. A method according to claim 1 wherein the step of adjusting a transmit signal power includes the step of comparing the received signal strength with a look-up table to determine the adjusted transmit signal power.

5. A method according to claim 1 wherein the step of adjusting a transmit signal power includes the step of calculating the adjusted transmit signal power from the received signal strength and the central location transmit power.

6. A method according to claim 1 further comprising a step of transmitting a voice signal in addition to said data signal on said communication line.

7. A method of reducing crosstalk among a plurality of communication lines, said method comprising:

receiving a signal at a subscriber unit from a central location over a communication line;

determining a received signal strength of said received signal at the subscriber unit;

in the absence of a central location transmit power reduction condition, adjusting in the subscriber unit a transmit signal power using said received signal strength such that a data signal transmitted over said communication line from the subscriber unit at the adjusted transmit signal power would be received at the central location at approximately a desired signal strength;

in the existence of a central location transmit power reduction condition, decreasing the transmit signal power; and transmitting a data signal at said adjusted transmit signal power from the subscriber unit to the central location over said communication line.

8. A method of reducing crosstalk among a plurality of communication lines. said method comprising:

receiving a signal at a subscriber unit from a central location over a communication line;

determining a received signal strength of said received signal at the subscriber unit;

determining from said received signal at the subscriber unit an existence of an external attenuation signal;

in the absence of an external attenuation signal, adjusting in the subscriber unit a transmit signal power using said received signal strength such that a data signal transmitted over said communication line from the subscriber unit at the adjusted transmit signal power would be received at the central location at approximately a desired signal strength;

in the existence of an external attenuation signal, decreasing the transmit signal power; and transmitting a data signal at said adjusted transmit signal power from the subscriber unit to the central location over said communication line.

9. A method of reducing crosstalk among a plurality of communication lines, said method comprising:

receiving a signal at a subscriber unit from a central location over a communication line;

transmitting to the subscriber unit information extracted from a database containing data regarding the distance from said central location;

determining a received signal strength of said received signal at the subscriber unit;

adjusting in the subscriber unit a transmit signal power using said received signal strength and said subscriber unit information such that a data signal transmitted over said communication line from the subscriber unit at the adjusted transmit signal power would be received at the central location at approximately a desired signal strength;

transmitting a data signal at said adjusted transmit signal power from the subscriber unit to the central location over said communication line.

10. A communication system for transmitting high speed digital data over a telephone network with reduced crosstalk, said communication system comprising:

a central location comprising a plurality of transceivers capable of transmitting signals to and receiving signals from a plurality of subscriber units;

a plurality of communication lines capable of conveying signals; and a plurality of subscriber units for transmitting and receiving signals, said subscriber units connected to said plurality of transceivers at a central location through said plurality of communication lines, at least one of said subscriber units being capable of determining an adjusted transmit signal power based upon a received data signal strength and transmitting at the adjusted transmit signal power such that a transmitted data signal is received at the central location at approximately a desired signal strength, said central location capable of sending an override signal containing an instruction to said at least one subscriber unit to set the adjusted transmit signal power to a level contained in the override signal and said at least one subscriber unit capable of setting the adjusted transmit signal power to the level indicated by the override signal.

11. A communication system according to claim 10 wherein said transceivers at the central location are capable of transmitting and receiving both voice and data signals and wherein said communication lines are capable of carrying both voice and data signals.

12. A communication system according to claim 10 wherein at least one of said communication lines is a telephone line of the twisted pair type.

13. A communication system according to claim 12 wherein at least one of said transceivers at said central location is a digital termination unit.

14. A communication system for transmitting high speed digital data over a telephone network with reduced crosstalk, said communication system comprising:
   a central location comprising a plurality of transceivers capable of transmitting signals to and receiving signals from a plurality of subscriber units;
   a plurality of communication lines capable of conveying signals;
   a plurality of subscriber units for transmitting and receiving signals, said subscriber units connected to said plurality of transceivers at a central location through said plurality of communication lines, at least one of said subscriber units being capable of determining an adjusted transmit signal power based upon a received data signal strength and transmitting at the adjusted transmit signal power such that a transmitted data signal is received at the central location at approximately a desired signal strength; and
   a subscriber database containing information regarding the distance from said central location of at least some of said plurality of subscriber units wherein said information can be transmitted to the at least some of said plurality of subscriber units;
   wherein the at least some of said plurality of subscriber units are capable of determining an adjusted transmit signal power based upon said information and transmitting at the adjusted signal power such that a transmitted data signal is received at the central location at approximately a desired signal strength.

15. A communication system for transmitting high speed digital data over a telephone network with reduced crosstalk, said communication system comprising:
   a central location comprising a plurality of transceivers capable of transmitting signals to and receiving signals from a plurality of subscriber units;
   a plurality of communication lines capable of conveying signals; and
   a plurality of subscriber units for transmitting and receiving signals, said subscriber units connected to said plurality of transceivers at a central location through said plurality of communication lines, at least one of said subscriber units being capable of determining an adjusted transmit signal power based upon a received data signal strength and transmitting at the adjusted transmit signal power such that a transmitted data signal is received at the central location at approximately a desired signal strength;
   said central location further being capable of transmitting at a reduced power and transmitting a signal indicating a central location transmit power reduction mode to said plurality of subscriber units; and
   wherein said at least one of said subscriber units further decreases the adjusted transmit signal power in response to a central location transmit power reduction.

16. A communication system for transmitting high speed digital data over a telephone network with reduced crosstalk, said communication system comprising:
   a central location comprising a plurality of transceivers capable of transmitting signals to and receiving signals from a plurality of subscriber units;
   a plurality of communication lines capable of conveying signals; and
   a plurality of subscriber units for transmitting and receiving signals, said subscriber units connected to said plurality of transceivers at a central location through said plurality of communication lines, at least one of said subscriber units being capable of determining an adjusted transmit signal power based upon a received data signal strength and transmitting at the adjusted transmit signal power such that a transmitted data signal is received at the central location at approximately a desired signal strength;
   said central location further capable of transmitting external attenuation signals indicating an amount at external attenuation on said plurality of communication lines to said plurality of subscriber units; and
   wherein said at least one of said subscriber units further decreases the adjusted transmit signal power in response to an external attenuation signal.

17. A subscriber unit for communicating with a central location and reducing crosstalk within a telephone network in a high speed data communications system, said subscriber unit comprising:
   a data signal transceiver for transmitting data signals to and receiving data signals from a central location;
   a micro-controller connected to said transceiver for determining an adjusted transmit signal power based upon a received data signal strength and a command received from a central location through said transceiver, such that a data signal transmitted at the adjusted transmit signal power is received at the central location at approximately a desired signal strength; and
   a controllable attenuator connected to and controlled by said micro-controller for adjusting a data signal to the adjusted transmit signal power,
   wherein the micro-controller can receive an override signal containing an instruction from the central location to set the adjusted transmit signal power to a level contained in the override signal.

18. A subscriber unit according to claim 17 wherein the data signal transceiver comprises at least one of a quadrature amplitude modulation transceiver, a discrete multi-tone transceiver and a carrier-less amplitude and phase transceiver.

19. A subscriber unit according to claim 17 wherein the micro-controller further comprises a look-up table for determining an adjusted transmit signal power.

20. A subscriber unit for communicating with a central location and reducing crosstalk within a telephone network in a high speed data communications system, said subscriber unit comprising:
   a data signal transceiver for transmitting data signals to and receiving data signals from a central location;
   a micro-controller connected to said transceiver for determining an adjusted transmit signal power based upon a received data signal strength and a command received from a central location through said transceiver, such that a data signal transmitted at the adjusted transmit signal power is received at the central location at approximately a desired signal strength; and a controllable attenuator connected to and controlled by said micro-controller for adjusting a data signal to the adjusted transmit signal power;

wherein said micro-controller can receive information regarding the distance from said central location to said subscriber unit extracted from a database and transmitted by the central unit and use this information in determining an adjusted transmit signal power.

21. A subscriber unit for communicating with a central location and reducing crosstalk within a telephone network in a high speed data communications system, said subscriber unit comprising:

a data signal transceiver for transmitting data signals to and receiving data signals from a central location;

a micro-controller connected to said transceiver for determining an adjusted transmit signal power based upon a received data signal strength and a command received from a central location through said transceiver, such that a data signal transmitted at the adjusted transmit signal power is received at the central location at approximately a desired signal strength; and a controllable attenuator connected to and controlled by said micro-controller for adjusting a data signal to the adjusted transmit signal power;

wherein said micro-controller can receive a data signal transmitted by the central unit to indicate that said central unit is transmitting at reduced power and use the data signal in determining an adjusted transmit signal power.

22. A subscriber unit for communicating with a central location and reducing crosstalk within a telephone network in a high speed data communications system said subscriber unit comprising:

a data signal transceiver for transmitting data signals to and receiving data signals from a central location;

a micro-controller connected to said transceiver for determining an adjusted transmit signal power based upon a received data signal strength and a command received from a central location through said transceiver, such that a data signal transmitted at the adjusted transmit signal power is received at the central location at approximately a desired signal strength; and a controllable attenuator connected to and controlled by said micro-controller for adjusting a data signal to the adjusted transmit signal power;

wherein said micro-controller can receive an external attenuation signal transmitted by the central unit to indicate a required transmit signal attenuation and use the external attenuation signal in determining an adjusted transmit signal power.

* * * * *